July 5, 1966   J. W. SMITH   3,259,048
APPARATUS FOR MAKING POSITIVE COPIES
Filed Dec. 1, 1961

INVENTOR.
JOHN WESLEY SMITH
BY
ATTORNEY

United States Patent Office 3,259,048
Patented July 5, 1966

3,259,048
APPARATUS FOR MAKING POSITIVE COPIES
John Wesley Smith, c/o Philadelphia Air Transport Co.,
Box 27, Norristown, Pa.
Filed Dec. 1, 1961, Ser. No. 156,546
2 Claims. (Cl. 95—94)

This invention relates generally to the photographic arts, and, in particular, to a method and apparatus for making a positive copy as a result of a single exposure of a specially coated sheet of sensitized paper.

The invention may also be applied to conventional photographic processing methods, in that it provides apparatus adapted to receive an exposed photographic sheet and to develop, fix, and dry said photographic sheet by means of known processing solutions.

The apparatus of the invention is preferably embodied as a unit combining a camera employing the "lens-first surface coated mirror principle" so that the subject may be placed, for convenience, at an angle to the axis of the lens-assembly of the camera, and, further, so that the copy of the subject within the camera is "right-reading" —in other words, not the usual mirror-image copy, a copy-board or copy table, adjustable lights for illuminating the subject placed on the copy-board or copy-table, a processing or developing means, and a dryer, all attached to or connected with the camera. The drawing herein shows this combination as a preferred embodiment of the invention; but it is to be understood that this embodiment is not in limitation of the invention and is simply that embodiment found most desirable for manufacture and use.

The method of the invention as applied to diffusion transfer is essentially the making of a positive copy by exposing the copy-sheet a single time to the subject desired to be copied. With respect to the novelty and utility of the method it is immaterial whether the single exposure of the copy-sheet—i.e., film—to an illuminated subject to be copied involves projection of light through an optical lenticular system or is simply a contact print. Since, however, the method is desired to be flexible enough to make possible the copying of not only flat documents but also books and other objects which may be expected to be more or less opaque and therefore unsuited for contact-printing, and, of course, since the single-exposure positive copy made possible by the present invention is understandably desired to be "right-reading" and not a mirror-image of the subject, the use of an optical lenticular system and a reversing mirror is substantially a commercial requisite.

The method includes, as an essential part thereof, the use of specially coated paper or film. (The illustrated apparatus, for purposes of convenience, is adapted to use separate sensitized sheets instead of a sensitized web.) The sheets employed herein are coated on one side with two superposed coats or layers. The upper or outer layer is, preferably, a water soluble gelatinous carrier of a light-sensitive metallic salt. The under or inner layer comprises a diffusion accepting or reception material. After the single exposure the sheet is carried by automatic conveyor means through processing or developing solution capable of developing the light-sensitive material in the upper layer and rendering the gelatinous carrier soluble in cold water. The unexposed and undeveloped metallic salts of the upper layer—that portion of the salts which correspond to the non-light-reflecting portion of the illuminated subject—are diffused to the lower reception layer and form the positive copy. The sheet is agitated, according to the art, during its travel in the developer and, at a slow rate of speed, is carried out of the developer, through a cold water wash (sprays) to remove the unused portions of the outer layer; then the sheet is dried, and delivered ready for use. The foregoing is fully explained in the general descriptive part of the specification, which includes adequate chemical detail.

Although the invention has above been described mainly in connection with the diffusion transfer process, as has been indicated this is not an essential limitation of the scope or application of the invention, and it may be applied to the conventional photographic process wherein a photographic sheet is exposed to an object or subject and then developed, fixed, and dried to form either a negative or positive photograph. The usual steps in such process are exposure, developing, rinsing, fixing, washing and drying. The apparatus herein claimed may be adapted to carry an exposed photographic film through each of these stages or any other number of stages which a given process may require.

For example, a tray may be provided which is partitioned into a series of successive non-communicating chambers, the first containing a developing solution, the second a rinsing liquid, the third a fixing solution, and the fourth a washing liquid. A dryer would be disposed adjacent the fourth chamber. An intermittently movable carrier, or a pair of cooperative, intermittently movable carriers, which may be 180 degrees out of phase, could be provided in said partitioned tray. The carrier would have a plurality of upwardly inclined portions adapted to carry the photographic film out of each of said chambers and over the partitions, and it would also be provided with a plurality of downwardly sloping portions adapted to carry the film into the succeeding chambers. After exposure the film would be deposited into the first chamber and onto the first upwardly inclined portion of the carrier, which would carry it into the second chamber. The final upwardly inclined portion would carry the film out of the last chamber and over its end wall into the dryer. In short, a continuous but intermittently movable conveyor system is herein provided, linking the exposure and drying components by carrying the exposed film into and out of the several chambers above described wherein the developing, rinsing, fixing, and washing phases of the operation occur. It is extremely important to note that the intermittent movement of the conveyor produces an agiating effect which is essential in the developing process.

The apparatus of the invention, in the preferred diffusion transfer embodiment shown diagrammatically herein, comprises a combination of elements, some of which are old, but which, together, form not only a new combination, but a combination which renders possible the working of a new and useful method of producing positive copies of a graphic original, faster, with less labor, fewer materials and chemicals, and more economically than is possible in conventional processes.

Figure 1:
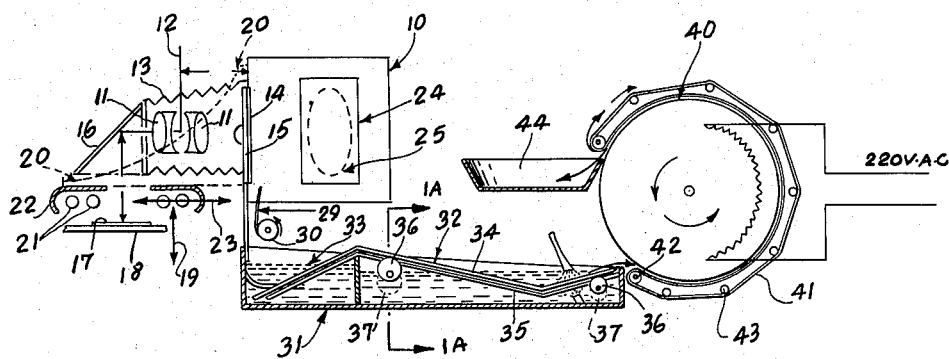
FIGURE 1 is a side elevational diagrammatic view of a preferred embodiment of the apparatus of the invention.

In FIG. 1, a camera, designated generally 10 is indicated to the left; a processing tray and washing and drying means for copies appear beneath the camera and to the right of the figure.

Taking up the camera first, its focal axis is horizontal—an arbitrary circumstance, but, as will be seen, an election which is a great convenience to operation of the entire apparatus. Then lens assembly—obviously not necessary to be shown in complete detail—includes, as usual, a diaphragm, shutter, and timer, these elements, not shown, all being adjustable to predetermine the amount and duration of light enabled to reach the copy-sheet, which, itself is one of the most salient features of the present invention. The lens assembly is illustrated, insofar as the actual lenticular part thereof is concerned, and is indexed 11, and permits of the diagrammatic indication, at 12, of the central vertical plane of the lens assembly.

The lens assembly 11 is shown to be mounted before the actual camera obscura at the end of a bellows structure 13, capable, as is well known, of expanding and contracting, to vary the focal length between the plane 12 and the sensitized copy-sheet 14 (cf., two oppositely disposed arrows). In front of the copy-sheet is a plane glass window 15, adapted to hold the copy-sheet in the proper flattened, or vertically planar, condition during the single exposure required in the present invention.

Plainly, if light from the illuminated subject impinges directly upon the copy-sheet, a mirror-image copy will result, as is usual in conventional photography. It is particularly desired—especially since, in this embodiment of the invention, no subsequent opportunity is provided for reversing-forming first exposure for making a projection, or so-called "optical" print, or a contact print—that reversal of the light rays from the illuminated subject be had before impingement upon the copy sheet. Therefore, in the present camera—for this, and another obvious reason (see below)—the "lens-first surface coated mirror principle" is adopted. In front of the lens, the focal axis of which is horizontal, is mounted—preferably on the outer end of the bellows structure 13—a mirror 16 disposed at 45° both to the horizontal and to the vertical. The proximate surface of the mirror is coated with aluminum and silicon monoxide; and, quite understandably, the surface of the mirror is as truly planed as practicable.

Accordingly, the subject 17 may be placed upon a vertically adjustable horizontal copy-board or -table 18. The subject, presumably a flat graphic original, the copy-board or copy-table, and a double-headed arrow 19 are all indicated with diagrammatic simplicity. It is needless to illustrate supporting and elevating structure for the copy-board or copy-table as such structure is well-known in the art. Means are required adequately to illuminate the subject; and in the apparatus shown such means comprise two oppositely disposed light sources above the copy-board or copy-table and beneath the specially coated mirror 16. These means comprise two cantilevers 20 (only one of which appears) fixed to the front of the camera obscura 10, carrying two sets of fluorescent tubes with reflectors, at least one set being horizontally adjustable on the cantilevers 20 nearer and farther away from the other set, as required by the nature of the subject.

With respect to the foregoing, it will be understood that the focal length between the subject mounted on the copy-board or copy-table, and the mirror 16 may be varied in an equivalent manner to the adjustment of the focal length between the lens and the copy-sheet (see above; cf., also the two oppositely disposed vertical arrows). Plainly the subject may be enlarged or reduced, as desired. And, of course, by employment of the reversing mirror 16 the copy made within the camera is "right reading," and not a mirror image, that is, the graphic material appears on the copy as it appears on the subject original to the eye.

Preferably the two light sources each comprise at least two green fluorescent 100 v. A.C. tubes and a common reflector. All tubes are indexed 21 and each reflector 22. The tubes and reflector indicated to the right are preferably movable with respect to the other light source not only to accommodate different sizes of subjects, but to accord with the forward and rearward movability of the lens assembly-reflecting mirror unit. The movability of said unit horizontally along the cantilevers is indicated by a double-headed arrow 23. The advantage of the direct green rays of the tubes 21 is that it is self-sufficient without a filter. The light is suited to the proper illumination of subjects white or tinted, on which the characters are black or even in purple hectograph ink, or if the subject is a blueprint or other kind of photocopy; and the green fluorescent light is balanced with the color-sensitivity of the copy-sheets used in the present apparatus and forming an essential part of the invention.

As desired the copy-board or copy-table 18 may be a plane glass-covered platform suitable for use with flat documents, records, and other similarly shaped subjects; or it may be provided with a glass-covered book-holder or a comparable device for holding the surfaces of subjects more or less flat for proper illumination.

Provided in the sidewall (in the foreground of FIG. 1) of the camera obscura, is a door 24 giving access into the interior of the camera, the door being provided with a light-shielding arm-sleeve 25. In any suitable manner a supply of unexposed copy-sheets may be inserted through the door into the camera obscura, preferably in a light-proof container, and, after the door 24 is closed, these sheets may be manually removed from the container one by one through sleeve 25 and positioned against the plane glass window 15 for exposure upon proper focal adjustments with respect to the distance between the lens and that between the copy-sheet and the reversing mirror and the subject upon the copy-board or copy-table, and proper energization and adjustment of the light source. (It will be understood that the details of the foregoing appropriate placing of individual copy-sheets are not a limiting part of the invention.)

Figure 3:
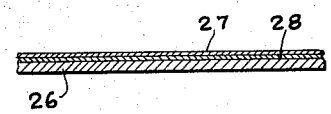
FIGURE 3 is a diagrammatical section of a copy-sheet of the type described herein, the section being much amplified for clarity.
Figure 1A:
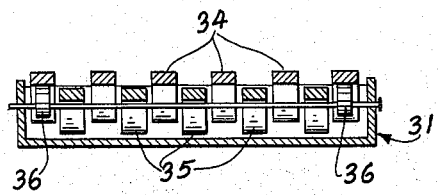
FIGURE 1A is a section on the line 1A—1A of FIGURE 1.

One of the most important elements of the invention is the copy-sheet 14 and its structure. A diagrammatic broken section of a single copy-sheet appears in FIG. 3.

The copy-sheet comprises a suitable base 26 of material both impervious to the developer, presently to be described and to water, coated with two superposed layers of emulsion on the same side. The upper or outer layer of emulsion 27 is high-speed orthochromatic light-sensitive and is a gelatinous carrier of a metallic salts, such as silver halide. The lower or inner layer of emulsion 28 is insoluble in the developer and in water, and contains a reducing agent. The outermost layer of emulsion is, of course, intended to be presented to the plane glass window and exposed to light reflected through the lens by the reversing mirror from the illuminated subject.

After exposure the sheet 14 is dropped into a suitable chute 29, wherein the sheet is engaged and propelled by at least one feed roller 30 into a developing tray 31 and onto a presently-to-be-described agitating and conveyor mechanism, generally designated 32 (arrow).

The processing solution contained within the tray 31 is sketchily indicated as a section of liquid and is indexed 33. The processing solution has the properties of both developing the exposed portions of the light-sensitive metallic salts in the outer layer, dissolving or fixing the unexposed portions of these salts while rendering their gelatinous carrier water-soluble, and finally causing or enabling said unexposed and undeveloped salts to be diffused onto and into the lower reception layer of emulsion where they form a positive copy by being reduced to metal.

An exemplary formula for a processing solution as herein used is one having substantially the following composition:

| | Gm. |
|---|---|
| 1-phenyl-3-pyrazolidone | 1 |
| Hydroquinone | 15 |
| Potassium metabisulfate | 0.5 |
| Sodium sulfite (anhydrous) | 45 |
| Sodium hydroxide | 15 |
| Sodium thiosulfate (crystal) | 15.7 |
| Potassium bromide | 1 |
| Sodium hexa-metaphosphate | 1 |
| Water to 1 liter. | |

The agitator and conveyor mechanism comprises, as a preferred stucture, a first frame 34 and a second frame 35, each frame comprising a plurality of transversely spaced, longitudinally extending parallel rods, the rods of each frame being securely and rigidly connected to each other by cross-members to form a unitary member. The rods of each frame alternate spatially with the rods of the other frame, and the frames are so arranged that each is free to move in an orbital path within a vertical plane, coinciding with the orbital path of the other but 180 degrees out of phase therewith. These orbital movements will bring the two frames into oppositely disposed positions, one above the other, and continued orbital movement will reverse this orientation so that the upper frame will now become the lower, and the lower will become the upper. The direction of orbital movement of the two frames is such that when each is in its upper position it moves forwardly—that is, rightwardly as viewed in FIG. 1 of the drawing, in the direction from the camera to dryer 40. Conversely, when each frame is in its lower position its direction of movement is rearward—that is, leftward as viewed in the drawing, from the dryer back toward the camera.

The orbital movement is achieved by means of two series of coaxial eccentrics 36 and 37 located at each end of the two frames, the nearest eccentric of each series obscuring the others of the series. Suitable motor drive means are provided for causing rotation of said eccentrics about their respective axes. By the same token, suitable bearings are provided between said frames and said eccentrics. The photographic sheet rides only on that frame which is elevated and moving forwardly, the lower and rearwardly moving frame being out of contact therewith. Hence, the sheet is intermittently "walked" and thereby agitated and carried through the processing and washing phases to dryer 40. This dryer may comprise an internally heated rotary drum partially encircled by an endless band or belt 41 mounted on rollers 42. The inner run of the belt bears against the drum while its outer run is spaced therefrom by supporting frame 43. The processed sheet is inserted by the carrier frames between the drum and inner run of the belt where it is dried and carried around and finally deposited into a collecting tray 44.

Figure 2:
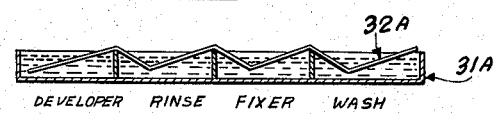
FIGURE 2 is a side elevational diagrammatic view of a modification of a portion of the foregoing.

FIG. 2 shows a modified form of the invention wherein a multi-partioned tray 31A is provided with four successive chambers containing, respectfully, a developer, rinsing liquid, a fixer and a washing liquid. A multi-stage "walking" carrier (or carriers) 32A is provided to carry a photographic sheet through each of the chambers to develop, rinse, fix and wash it.

What is claimed is:
1. Photographic developing apparatus, comprising a tray, at least one partition dividing said tray into a series of successive non-communicating chambers, at least the first of said chambers being adapted to contain a photographic processing solution, and a plurality of slatted photographic sheet carriers, including rods extending from the first chamber to the second across said partition, and means intermittently moving said carriers to conduct a photographic sheet through the processing solution in the first chamber, then over the partition and into and through the second chamber, wherein the second chamber is adapted to contain a washing liquid, the photographic sheet being developed and fixed in the photographic processing solution in the first chamber and being washed in the second chamber, said photographic sheet carriers having upwardly inclined portions which extend upwardly from the first chamber over the partition, and downwardly sloping portions extending downwardly from above the partition into the second chamber, the photographic processing solution being drained off the photographic sheet while the same is being carried diagonally upwardly on the upwardly inclined portion of the carrier, and said photographic sheet carriers being also provided with additional upwardly inclined portions extending upwardly from said downwardly sloping portions, said additional upwardly inclined portions being adapted to carry the photographic sheet diagonally upwardly out of the second chamber, thereby draining said photographic sheet of the washing liquid.

2. Photographic developing apparatus, comprising a tray, at least one partition dividing said tray into a series of successive non-communicating chambers, at least the first of said chambers being adapted to contain a photographic processing solution, and a plurality of slatted photographic sheet carriers, including rods, extending from the first chamber to the second across said partition, and means intermittently moving said carriers to conduct a photographic sheet through the processing solution in the first chamber, then over the partition and into and through the second chamber, three partitions being provided which divide the tray into a series of successive, non-communicating chambers, the first being adapted to contain a photographic developing solution, the second being adapted to contain a rinsing liquid, the third being adapted to contain a photographic fixing solution, and the fourth being adapted to contain a washing liquid, said photographic sheet carrier being provided with a first upwardly inclined portion to carry a photographic sheet out of the developing chamber and over the first partition, a first downwardly sloping portion to carry the photographic sheet into the rinsing chamber, a second upwardly inclined portion to carry the photographic sheet out of the rinsing chamber and over the second partition, a second downwardly sloping portion to carry the photographic sheet down into the fixing chamber, a third upwardly inclined portion to carry the photographic sheet out of the fixing chamber and over the third partition, a third downwardly sloping portion to carry the photographic sheet downwardly into the washing chamber, and a fourth upwardly inclined portion to carry said photographic sheet out of said washing chamber.

References Cited by the Examiner
UNITED STATES PATENTS

| 1,808,669 | 6/1931 | Liberman | 95—14 |
| 1,832,296 | 11/1931 | Greene | 95—14 |
| 1,867,172 | 7/1932 | Ranger | 95—94 |
| 2,176,000 | 10/1939 | Albano | 95—94 |
| 2,398,616 | 4/1946 | Brunk | 95—94 |
| 2,545,031 | 3/1951 | Izzi | 95—98 |
| 2,894,737 | 7/1959 | Haugwitz | 198—219 X |
| 2,962,377 | 11/1960 | Land | 96—29 |
| 3,003,871 | 10/1961 | Land | 96—29 |
| 3,023,686 | 3/1962 | Meyer | 95—94 |

NORTON ANSHER, *Primary Examiner.*

DELBERT B. LOWE, JOHN M. HORAN, *Examiners.*
JACK R. BLOOM, WILLIAM E. JACKSON,
*Assistant Examiners.*